UNITED STATES PATENT OFFICE.

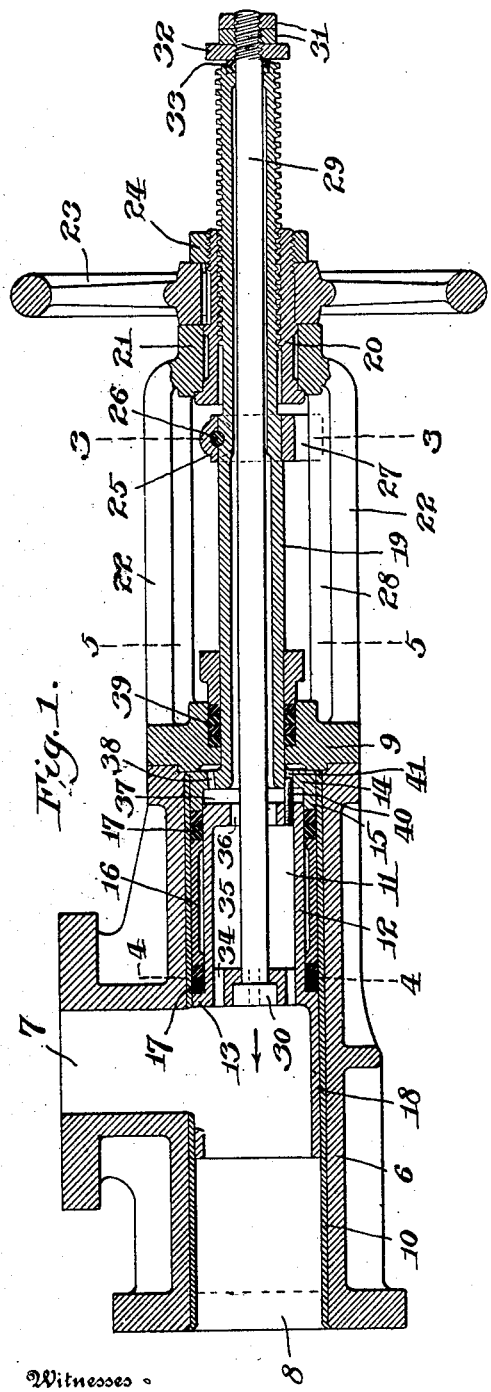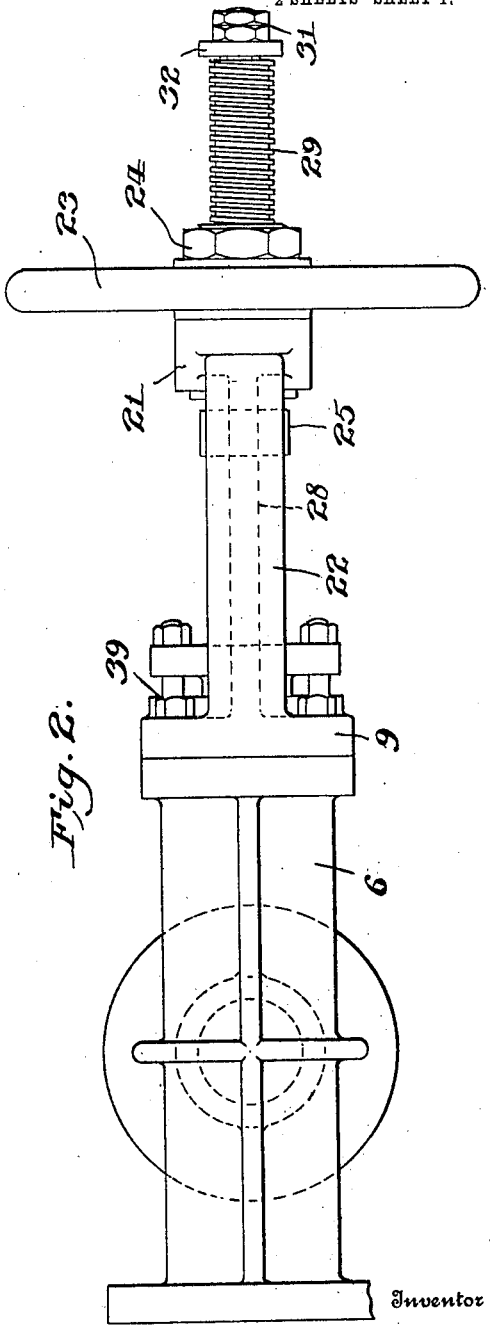

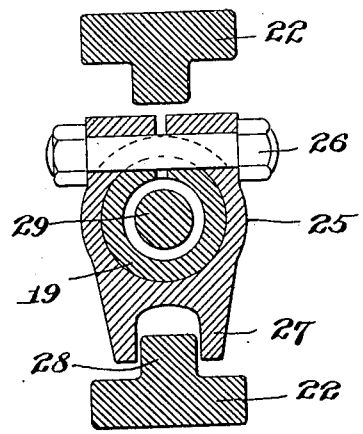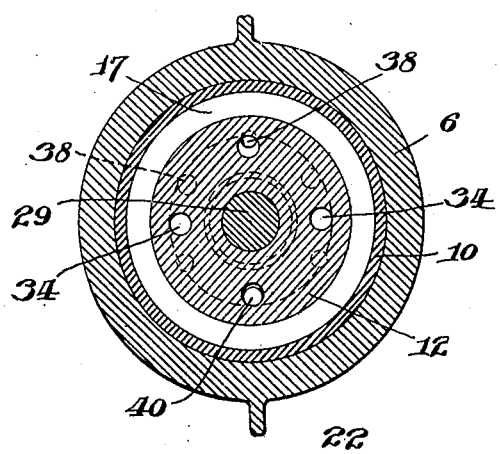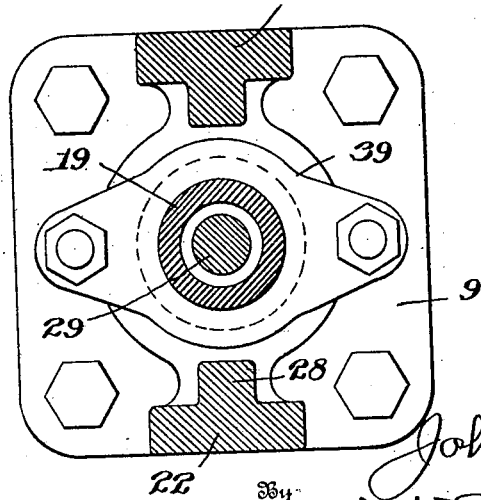

JOHNSTON NOLAN, OF PHILADELPHIA, PENNSYLVANIA.

PISTON-VALVE.

No. 913,968.  Specification of Letters Patent.  Patented March 2, 1909.

Application filed November 16, 1907. Serial No. 402,385.

*To all whom it may concern:*

Be it known that I, JOHNSTON NOLAN, a citizen of the United States, residing at Philadelphia, in the county of Philadelphia and State of Pennsylvania, have invented certain new and useful Improvements in Piston-Valves, of which the following is a specification.

This invention relates to piston valves, and particularly to piston blow off valves for steam boilers.

The object of the invention is to provide a piston valve wherein ease and efficiency of operation are combined with simplicity and durability of construction.

To this end, the invention consists in the novel construction and combination of parts which I shall hereinafter fully describe and claim.

In the drawings:—Figure 1 is a longitudinal sectional view of my improved valve. Fig. 2 is a bottom view thereof. Figs. 3, 4, and 5 are transverse sectional views as on the lines 3—3, 4—4, and 5—5 respectively, of Fig. 1.

6 designates a cylindrical casing having a valve inlet 7 therein, and having also a valve outlet 8 therein. One end of the casing 6 is closed by a head 9, and the interior of the casing is provided with a suitable bushing 10.

Fitted to the interior of the casing is a piston 11, comprising a body portion 12, having a flange 13 on its forward end, a head 14 provided with a collar 15 surrounding the rearward end of the body 12, a spacing collar 16 surrounding the body 12, and packing rings 17 surrounding the body 12 and interposed between the collar 16 and flange 13, and collars 15 and 16.

The length of the ring 16 is such that when the piston is moved in the direction indicated by the arrow in Fig. 1, the packing rings 17 at each end of the collar 16 will occupy a position on each side of the inlet opening 7 when the valve is closed.

Projecting forwardly from the forward end of the piston 11, is a guard 18 extending around the inner wall of the casing to protect said wall from anything that may be blown forcibly through the inlet opening 7 of the valve, and thus preserve a true seat for the packing rings 17.

Formed on or secured to the rearward end of the piston or head 14, is the inner end of a stem 19, which extends outwardly through an opening in the head 9. The outer end of the stem 19 is screw-threaded, and fitted to the screw threads thereof is an internal collar 20, which surrounds the stem 19 and is rotatably mounted in a boss 21 which forms the outer end of a frame 22 projecting from the end head 9. Mounted upon the collar 20 and keyed thereto is a hand wheel 23, which is held in place by a nut 24 screwed on to the collar 20.

By turning the hand wheel 23, the stem 19 and therewith the piston 11 may be moved longitudinally to open and close the valve, as desired.

In order to prevent rotation of the piston 11, during the operation of the hand wheel 23, I provide a split collar 25, which surrounds the stem 19 and is secured thereto by a bolt 26, the collar 25 being provided with a bifurcated extension 27, which embraces a rib 28 on the frame 22, and is slidably engaged therewith.

Extending axially through the stem 19 and piston 11, is a rod 29, the inner end of which is provided with a head 30, fitted to a socket in the inner end of the piston 11. The outer end of the rod 29 extends beyond the stem 19, and is screw-threaded for the reception of nuts 31, which take against a ring 32 surrounding the rod 29, the ring 32 in turn bearing against packing rings 33 which are arranged within a depression in the outer end of the stem 19, and which surround the rod 29.

The packing rings 33 afford a tight joint between the stem 19 and rod 29, and by manipulating the nuts 31, the rod 29 and therewith the body 12 of the piston 11 and flange 13 may be moved in opposition to the stem 19 and therewith the head 14 and collar 15, thus forcing the flange 13 and collar 15 toward each other and causing an expansion of the packing rings 17.

In order to prevent rotation of the body 12 of the piston 11 during the adjustment of the packing rings 17, I provide said body with a pin 40, which is slidingly fitted to an opening 41 in the head 14. Thus the packing rings 17 may be adjusted or expanded to compensate for wear.

In order to permit the fluid pressure within the valve casing to act upon both the forward and rearward ends of the piston 11, to permit the piston to be moved in either direction with comparative ease, I provide a passageway for establishing communication between the parts of the casing 6 through which the forward and rearward ends of the piston move. In the present embodiment of my invention, this passageway comprises openings 34, 35, and 36, extending through the body 12 of the piston, and openings 37 and 38 extending through the collar 15 and head 14 of the piston.

In order to prevent any leakage of pressure fluid from the casing through the opening through which the stem 19 extends, I provide, in the head 9, a suitable stuffing box 39, through which the stem 19 extends.

I claim:—

1. In a valve, the combination of a cylindrical casing having inlet and outlet openings therein, a piston within said casing and having two separate ends movable toward and from each other, packing rings interposed between said ends, a stem projecting from the rearward end of said piston and through a wall of the casing, means for operating said stem to move the piston, a rod extending through said stem and engaging the forward movable end of said piston, means for adjusting said rod, and means to prevent the rotation of the forward movable end of the piston during the adjustment of said rod.

2. In a valve, the combination of a cylindrical casing having inlet and outlet openings therein; a piston within the casing and comprising a cylindrical body portion having a flange on its forward end, and an end portion provided with a collar surrounding the body portion; packing rings surrounding said body portion between said flange and said collar, means for adjusting said body portion toward said end portion, means to prevent the turning of the body portion during the adjustment thereof, and means for adjusting the piston.

3. In a valve, the combination of a cylindrical casing having inlet and outlet openings therein; a piston within the casing and comprising a cylindrical body portion having a flange on its forward end, and an end portion provided with a collar surrounding the body portion; a spacing collar surrounding said body portion between said flange and said collar, packing surrounding said body portion between one end of the spacing collar and the collar on said end portion, packing surrounding said body portion between the other end of the spacing collar and said flange means for adjusting said body portion toward said end portion, and means for adjusting the piston.

4. In a valve, the combination of a cylindrical casing having inlet and outlet openings therein; a piston within the casing and comprising a cylindrical body portion having a flange on its forward end, and an end portion provided with a collar surrounding the body portion; a spacing collar surrounding said body portion between said flange and said collar, packing surrounding said body portion between one end of the spacing collar and the collar on said end portion, packing surrounding said body portion between the other end of the spacing collar and said flange, means for adjusting said body portion toward said end portion, means to prevent the turning of the body portion during the adjustment thereof, and means for adjusting the piston.

In testimony whereof I affix my signature in presence of two witnesses.

JOHNSTON NOLAN.

Witnesses:
 SADIE I. HARPER,
 A. V. GROUPE.